(12) United States Patent
Deganello et al.

(10) Patent No.: US 7,185,280 B2
(45) Date of Patent: Feb. 27, 2007

(54) PERSONALIZED AUTOMATIC PUBLISHING EXTENSIBLE LAYOUTS

(75) Inventors: Natasha Deganello, San Francisco, CA (US); Stephane Giraudie, San Francisco, CA (US); Patrice Vallmajo, Antibes (FR)

(73) Assignee: Papilia, Inc., San Francisco, CA (US)

(*) Notice: Subject to any disclaimer, the term of this patent is extended or adjusted under 35 U.S.C. 154(b) by 0 days.

(21) Appl. No.: 10/964,301

(22) Filed: Oct. 13, 2004

(65) Prior Publication Data

US 2005/0081148 A1    Apr. 14, 2005

Related U.S. Application Data

(60) Provisional application No. 60/511,606, filed on Oct. 14, 2003.

(51) Int. Cl.
  *G06F 17/24* (2006.01)
(52) U.S. Cl. ..................................... 715/530
(58) Field of Classification Search .......... 715/530
  See application file for complete search history.

(56) References Cited

U.S. PATENT DOCUMENTS

| | | | |
|---|---|---|---|
| 5,657,015 A | 8/1997 | Nakajima et al. | |
| 5,928,330 A | 7/1999 | Goetz et al. | |
| 5,987,480 A * | 11/1999 | Donohue et al. | 715/501.1 |
| 6,070,002 A | 5/2000 | Hagemark et al. | |
| 6,157,924 A * | 12/2000 | Austin | 715/513 |
| 6,195,101 B1 | 2/2001 | Ghislain Bossut et al. | |
| 6,198,770 B1 | 3/2001 | Kondo | |
| 6,237,053 B1 | 5/2001 | Herrod et al. | |
| 6,317,134 B1 | 11/2001 | Hagemark et al. | |
| 6,407,680 B1 | 6/2002 | Lai et al. | |
| 6,466,939 B1 | 10/2002 | Lai et al. | |
| 6,593,860 B2 | 7/2003 | Lai et al. | |
| 6,944,817 B1 * | 9/2005 | Danneels | 715/513 |
| 2002/0029179 A1 | 3/2002 | Gruber et al. | |
| 2002/0038225 A1 | 3/2002 | Klasky et al. | |
| 2002/0049816 A1 * | 4/2002 | Costin et al. | 709/206 |
| 2002/0062245 A1 * | 5/2002 | Niu et al. | 705/14 |
| 2002/0073088 A1 * | 6/2002 | Beckmann et al. | 707/10 |
| 2002/0091538 A1 | 7/2002 | Schwartz et al. | |
| 2002/0091800 A1 | 7/2002 | Wilkinson et al. | |
| 2002/0093507 A1 | 7/2002 | Olarig | |

(Continued)

OTHER PUBLICATIONS

Cattell, Rick, et al., J2EEE Technology in Practice: Building Business Applications With the Java2 Platform, Enterprise Edition, Chapter 7—"Java Technology Builds eTapestry.com ASP for Charities with Fort Tools" (Addison Wesley Publishing, © Jun. 1, 2001.*

(Continued)

*Primary Examiner*—Doug Hutton
(74) *Attorney, Agent, or Firm*—Fenwick & West LLP

(57) ABSTRACT

A software-based system automatically generates personalized communications including arrangements for communicating with various databases, servers and client systems. A smart templates document generator uses multiple categories and types of profiles such as case materials, destination and layout, and supporter profiles, as well as event, level and document profiles. The system further utilizes substantially or completely media independent communications of materials involving database and communications software architectures, input device/output display synchronization techniques, and graphics rendering software implementations.

20 Claims, 3 Drawing Sheets

U.S. PATENT DOCUMENTS

2002/0099770 A1 7/2002 Lindo et al.
2002/0099858 A1 7/2002 Lindo et al.
2004/0044949 A1* 3/2004 Rowe ........................ 715/500
2004/0205473 A1* 10/2004 Fisher et al. ................ 715/500

OTHER PUBLICATIONS

Website printout: http://www.papilia.com, printed Oct. 13, 2004, 8 pages.

* cited by examiner

PERSONALIZED AUTOMATIC PUBLISHING EXTENSIBLE LAYOUTS

PRIORITY

This application claims the benefit of priority under §35 USC 119(e) to U.S. provisional patent application entitled, "Personalized Automatic Publishing Extensive layouts", Ser. No. 60/511,606, filed on Oct. 14, 2003.

BACKGROUND

1. Field of the Invention

The invention relates to electronic and/or electronically-generated communications, and particularly to personalized automatic extensible layout publication based on multiple categories and types of profiles, and preferably utilizing substantially or completely media independent communication platforms.

2. Description of the Related Art

Software applications typically provide common templates to save time when building documents. Common templates are a collection of placeholders for a specific type of data. However, changing the type of data, output format or the final document are not possible in conventional software applications that address the generation of these templates and the communications media that implement them.

SUMMARY OF THE INVENTION

A system and method are provided for automatically generating personalized communications. A smart template is combined with input content to generate a smart template document by applying the input content to the smart template using one or more of multiple profiles. The document is communicated to a selected output location.

One or more profiles may be called from a storage location, and the document may be generated from one or more selectable sets of criteria. The multiple profiles may include categories of profiles. The multiple profiles may include a case materials profile, a destination profile, a layout profile, a supporter profile, an event profile, a level profile, or a document profile, or combinations thereof. The output location may be a personalized website. The smart template may be media independent.

DETAILED DESCRIPTION OF THE PREFERRED EMBODIMENTS

The system of these preferred embodiments advantageously provides unprecedented automating of personalized communications. Personalized communications are automatically generated by implementing software and a system of computer hardware components including arrangements for communicating with various databases and servers. An advantageous module includes a smart templates document generator which uses multiple types of profiles including those described in detail elsewhere herein. Categories and/or types of profiles that are preferably used to generate a communication include case materials, destination and layout, and supporter profiles. Event, level and document profiles are also preferably utilized. Brief descriptions of each of several illustrative classes and/or types of profiles are provided herein. Exemplary effects on documents of using profiles and further profile descriptions are provided. The system preferably also utilizes substantially or completely media independent communications of materials involving database and communications software architectures, input device/output display synchronization techniques, and graphics rendering software implementations.

Figure 1:
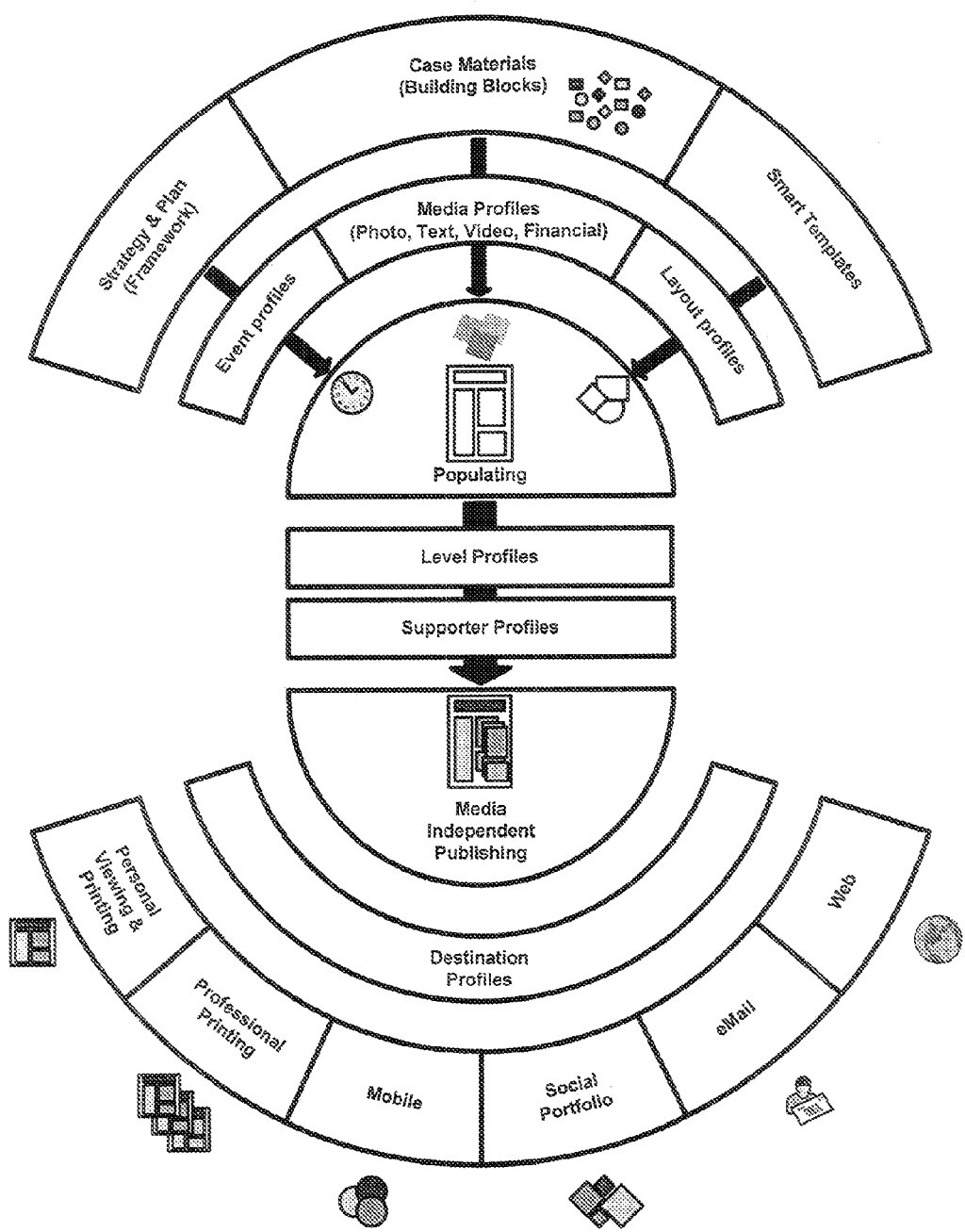
FIG. 1 schematically illustrates a software and communications architecture in accordance with a preferred embodiment.
Figure 2:
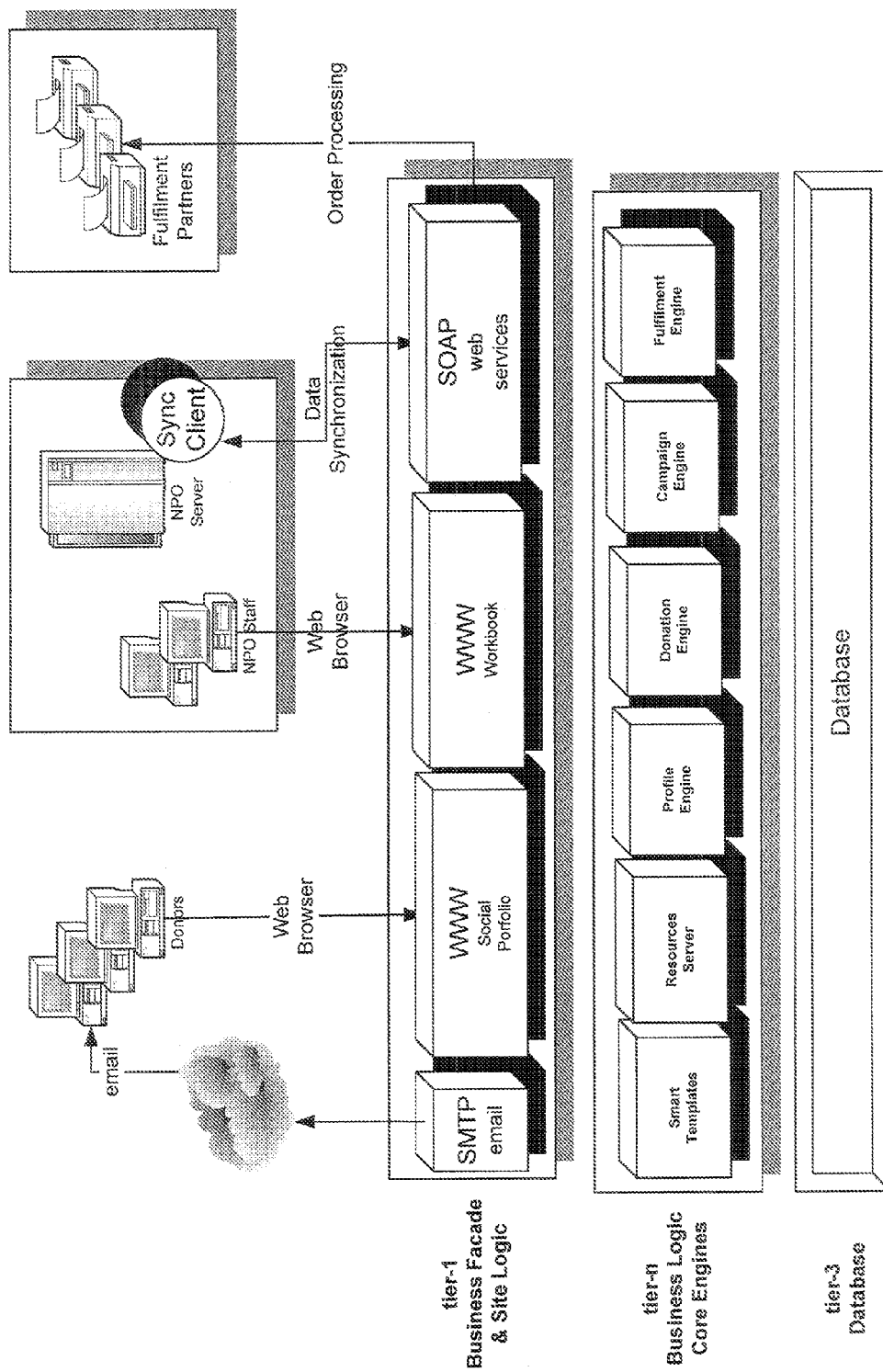
FIG. 2 schematically illustrates a high level architecture in accordance with a preferred embodiment.
Figure 3:
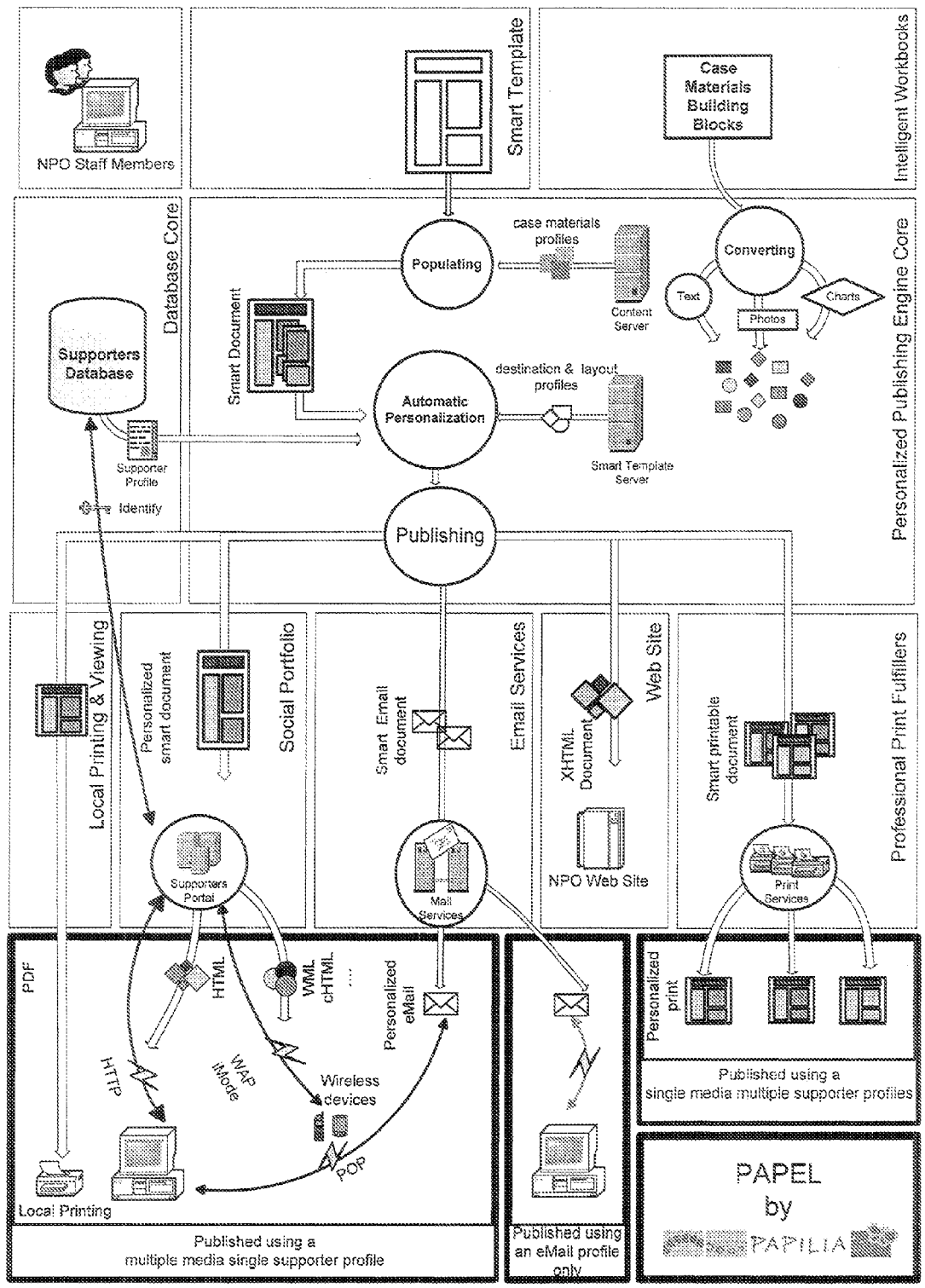
FIG. 3 schematically illustrates a system for automatically generating personalized communications in accordance with a preferred embodiment.

The system of the preferred embodiment is schematically represented at FIG. 1. The building blocks are the Case Materials that are used to communicate with constituents and that may be created in a collaborative, smart proprietary workbook system (e.g., referred to in FIG. 1 as "Case Builder") that provides users with strategic guidance from retention experts. The system is advantageous in its ability to automatically create highly personalized communications through multiple media including web, mobile and professionally printed media.

In this sense, "automatically" refers to the ability to generate many different variations of one communication material, when the actual user in fact only needs to create one or a subset including fewer than the system capable set. This saves the organization a lot of time related to developing stewardship and communications materials.

Moreover, the communications created are "highly personalized" referring to the ability of the system to generate communication materials that are highly relevant for each supporter. The relevance is generated by a combination of strategic frameworks, combined with the specific interests and preferences of each supporter found in the supporter profiles.

The "media independent" (or through multiple media) nature of the communications infrastructure refers to the ability of the system to regenerate the communication materials in real time according to the media that is required, substantially or completely independently of whether it is professionally printed, sent via email, distributed via phone, personal webpages, or by some other communication means understood by those skilled in the art.

Unlike dozens of "database-centric" and email-marketing software companies currently helping organizations with constituent acquisition, the system of the preferred embodiment focuses on retention and the powerful collateral management, creation, customization and publishing tools needed to support the sophisticated communications requirements of today's constituents. The system allows organizations to communicate the information that is most relevant to each individual on whatever schedule and in whatever format (print, Web, email, etc.) the constituent prefers. The system is designed to deliver scalable and personal interactions between organizations and each of their constituents.

In addition, the system may include consulting, training, and database management services that complement an online application to maximize the effectiveness of the offerings. The system utilizes Personalized Automatic Publishing Extensible Layouts, or "PAPEL" in its ability to automatically create highly personalized communications through multiple media including web, mobile and professionally printed media.

The system utilizes several advantageous components to provide a standard currently unmatched in the industry:

a. Media-Independent communication materials (i.e. Newsletters, annual Reports, Program Descriptions, etc.), which can be delivered by any media including but not limited to e-mail, published to individual web sites (Social Portfolio), sent via mobile devices or printed professionally using digital or traditional printing technologies.

b. Proprietary Smart Templates optimized for the Internet and built dynamically. The file parameters ("Profiles") being stored in a tiny file with pointers to the existing case materials.

c. Tailoring parameters (called "Profiles") applied to the publishing engine, allowing the organization to treat each supporter as a market of one. PAPILIA allows personalization for each communication material according to each supporter levels, profiles, preferences and interests with ease, pulling the organization's approved information from the case materials.

d. The Social Portfolio (Individual web pages) built dynamically for supporters and on their terms.

e. Multimedia Support (i.e. Photos, Graphics, Text and Layouts, Videos, Audios).

For the first time ever, organizations can engage their supporters as a market of one. The system of the preferred embodiment simply delivers a richer, fully realized supporter experience. From a centralized and collaborative platform, organizations build their case and set a strategic stewardship plan using Case Builder workbooks. This creates a context or framework in which interactions (i.e. Communication Materials) with various constituencies are personalized and tailored to the needs of both the organization and its supporters.

The system adopts a new approach by replacing the standard templates paradigm with a document generator paradigm that is referred to herein as a Smart Templates paradigm. While there are currently document formats such as HTML, which are "media-independent", the system of the preferred embodiment accommodates and optimizes documents in the actual document generator to the selected media, and output format and resolution required.

Smart Templates are dynamic templates that preferably use the newest XML and XSL/XSLT technologies and are not filled with actual data but what are referred to herein as "Profiles", which point to actual data or building blocks that can be text, images, videos, fonts, layouts and case or communication materials, and may always or generally be associated with one or more profiles. The profiles are relevant to the steps of the stewardship & communications process.

Specific rules of business are coded in several XSLT templates. XML files are created from business data stored in a database. Applying the business rules of the XSLT Templates to the XML file generates a new XML file which in turn may be processed by another XSLT template relevant to another part of the business, and so forth until the desired output format is reached.

ILLUSTRATIVE TYPES OF PROFILES

Case Materials profiles describe the parameters of the data of each particular case material. Case materials, can be thought of as building blocks, that are used to create communication materials. They can be made of text, images, spreadsheets, etc. Examples of case materials are the mission of the organization, program description, staff bios, photos, statistics, financial, etc. Each of these have certain attributes which determine their profile. For example a description of the gorilla program in a certain conservation organization, might contain the following attributes:

Data: Text, Photos
Expiration Date: 1 year
Interest Category: Mammals, Africa
Supporters Levels: All
Draft: Work in Progress Supporter profiles describe the supporter's unique preferences and interests. These include everything from what the supporter is interested in (Mammals), to what level he is (Major Donor), to how frequently he would like to receive updates (quarterly), to what medium he prefers (email).

Document profiles describe the type of document the communication material is. The communication materials are the end product that are used to interact with the supporters. A Document profile can be for example, an annual report or a newsletter, or a thank you note.

Layout profiles describe the style of the document. If the organization is working on a annual report, the layout profile, contains the information related to how the text and the images are laid out on a page. This might be, for example, a title across the top and 3 columns with the bottom third containing one large image.

Destination profiles describe the output compatibility for the document. Some documents are only meant to be distributed to a professional printer, others are designed to be sent via email, and others are appropriate for both.

Event profiles are used to trigger the publication of the events according to the fixed and flexible schedules of the Strategy & Plan section. For example, if a newsletter is scheduled to be published in April, then Papilia will prepare the files for publication on the set date.

Level profiles describe the supporter levels the document was designed for. For example, an annual report might only be created for major donors, but an email newsletter, might be meant to go out to all supporters.

Profiles can be stored on a file server or on a database.

The system of the preferred embodiment identifies supporters and retrieves their profiles from the database enabling a more personalized interaction. The publication is preferably made in three steps:

1. The publishing engine uses the user profile as a filter to select, skip, combine, or replace the different profiles inside a template and build a personalized one.

2. The publishing engine incorporates the content data to build a personalized document.

3. The publishing engine uses a destination profile to publish the document to the preferred/available media.

Smart templates are preferably dynamic and substantially or completely media-independent and may support a variety of output formats such as an unique Social Portfolio (personalized individual supporter web page), digital printing services and fulfillers, and email campaigns, among others understood by those skilled in the art.

The system of the preferred embodiment may be analogized to the chromosomes crossover, which gives preference to the expression of dominant genes (i.e., supporter specific interests), while recessive genes are masked out (i.e., other interest choices available)."

The preferred system involves a central point of publication and is able to track the most used profiles and return accurate and real-time feedback to the different reporting and key performance indicator tools.

SOME ILLUSTRATIVE ADVANTAGES

The system of the preferred embodiment helps organizations better retain their various constituencies (including customers, supporters, donors, members, volunteers, employees etc.) by better recognizing and responding to their interests and motivations through more personalized and relevant communications. The system includes a powerful personalization engine that enables organizations to provide constituents with whatever information is most relevant, on whatever schedule and in whatever format is preferred—whether online or professionally printed. The higher level of supporter service that the system enables, results in (1) increased retention; (2) increased amounts of transactions like donations or purchases; (3) new referrals by constituents; and (4) savings related to constituent service and communications.

ALTERNATIVE APPLICATIONS

Core competency involves customer cultivation. By virtue of its knowledge management for both communication materials and donor profiles and because of its collaborative nature. The system of the preferred embodiment may become deeply embedded within organizations such that it may be used in most every aspect of their communications infrastructure. In subsequent phases, the system may be expanded into additional areas. Some examples of other applications for the system include:

(a) Providing digital printing services for collateral, through partnership with existing digital print fulfillment houses.

(b) Building a corporate philanthropy system to help corporation better communicate the impact of their contributions to employees and customers in order to build branding and enhance corporate image.

(c) Developing a political platform whereby politicians could provide very relevant communications to their constituents.

(d) Offering a social portfolio where existing portals could enable their customers to monitor and track the impact of their contributions much like they currently track stock performance.

(e) Expanding on core competency to provide a customer cultivation platform to vertical markets outside, e.g., the non-profit world or whatever market niche an entity may be in.

To continue with this non-profit example, it is recognized that supporter engagement and loyalty is a top issue for most non-profit organizations. Most non-profit organizations manage this in-house, generally in a very unstructured, decentralized, or ad hoc basis. The system of the preferred embodiment permits supporter engagement and loyalty-based communications designed to foster greater efficiency to non-profit organizations that can facilitate retention efforts.

Use of scripting programs is an alternative to the preferred XML/XSLT approach described above. In this alternative case, an interpreter may be used for an object-oriented programming language such as JAVAScript (Sun Microsystems) or another scripting program that would be compatible with JAVAScript or another scripting program being used. Such may include, but is not limited to, CHAI (Hewlett-Packard), KAFFE (TransVirtual), LATTE (Seoul National University), SABLEVM (Sable Research Group), and DIS for the INFERNO operating system (LIMBO compiler; Lucent Technologies).

While an exemplary drawing and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention. For example, one or more elements of an actionable content management system with built in methodology and guidance may be configured differently than presented herein within the scope of the present invention, e.g., such as being the knowledge of those skilled in the art. Moreover, in one embodiment, smart templates may be utilized for the creation of and the publishing ability of personal websites for one or more of an organization's individual constituents. In terms of an actionable content database being a location where case materials may be stored in accordance with a preferred embodiment, the term "actionable" may refers to the tagging of the case materials and, given a certain profile, related, for example, to what programs it corresponds to. For example an article on the extinction of Gorillas, might be tagged as:

Interest Categories: Africa, Mammals, Gorillas
Priority: Urgent News
Supporter Levels: Relevant to All levels of Donors.

In another example, an invitation to Tea with the Queen might be labeled as:

Interest Categories: Relevant to all Interest Categories
Priority: High
Supporter Levels: Relevant only to Major Donors
Expires: Day after the event takes place These labels render content stored within the Case Material database actionable, because they are generally used in a process of automatic personalization in accordance with embodiments of the invention.

In terms of the built-in guidance and built-in methodology of a system and method in accordance with a preferred embodiment, stewardship is provided at a high level. Professional guidance, methodology and tips by industry experts, are provided as a user prepares communication materials in accordance with a preferred embodiment. An individual constituent that may receive a communication may be part of a larger organization, company or other entity. "Personalized websites", to which communications may be sent in accordance with a preferred embodiment, may include websites having individual customization of content according to one or more profiles of the recipient of the communication.

Also, multiple profiles have been described herein, wherein one or those includes a case materials profile. These case materials are preferably labeled, and thus "actionable". They can advantageously be used to automatically personalize communications with the most relevant content found in the case materials or otherwise with selected content or content meeting certain criteria. Other profiles mentioned include a destination profile, a layout profile, a supporter profile, an event profile, a level profile, and a document profile, and many other profiles may be include within a system or method in accordance with alternative embodiments of the invention. The output location may be a personalized website, an email, a professionally printed document, a digitally printed piece, or a communication through mobile devices, or combinations thereof, or other output locations as may be understood by those skilled in the art.

What follows is a cite list of references which, in addition to www.papilia.com, are hereby incorporated by reference as disclosing alternative embodiments of elements or features of the preferred embodiments not otherwise set forth in detail. A single one or a combination of two or more of these references may be consulted to obtain a variation of the preferred embodiments described in the detailed description below. The references include:

U.S. Pat. Nos. 6,195,101, 6,593,860, 6,407,680, 5,657,015, 6,466,939, 5,928,330, 6,317,134, 6,198,770, 6,237,053 and 6,070,002; and United States published applications no. 2002/0091800, 2002/0093507, 2002/0099858, and 2002/0099770.

In addition, in methods that may be performed according to preferred embodiments herein and that may have been described above, the operations have been described in selected typographical sequences. However, the sequences have been selected and so ordered for typographical convenience and are not intended to imply any particular order for performing the operations.

What is claimed is:

1. A method of automatically generating personalized communications, comprising:
   providing a smart template with a case material profile, the case material profile comprising an interest parameter, a supporter level parameter, and an expiration parameter;
   verifying the case material profile has not expired based on the expiration parameter;
   associating a first constituency profile and a second constituency profile with the smart template based on the interest parameter and the supporter level parameter, the first constituency profile comprising preferences corresponding to a first user, including a first schedule preference, and the second constituency profile comprising preferences corresponding to a second user, including a second schedule preference;
   selecting a first layout profile from a plurality of layout profiles and a first document profile from a plurality of document profiles, the selecting based on the first user preferences to generate a first smart template document, the first layout profile comprising a style of the first smart template document, the content and visual appearance of the first smart template document corresponding at least in part to the first layout profile and the first constituency profile, the type of document of the first smart template document corresponding to the first document profile;
   selecting a second layout profile from the plurality of layout profiles and a second document profile from the plurality of document profiles, the selecting based on the second user preferences to generate a second smart template document, the second layout profile comprising a style of the second smart template document, the content and visual appearance of the second smart template document corresponding at least in part to the second layout profile and the second constituency profile, the type of document of the second smart template document corresponding to the second document profile, wherein the first and second layout profiles are different layout profiles, the first and second document profiles are different document profiles; and
   generating the first smart template document, based on the first schedule preference of the first user, and the second smart template document, based on the second schedule preference of the second user.

2. The method of claim 1, further comprising selecting a first destination profile from a plurality of destination profiles, the first destination profile comprising an output compatibility of the first smart template document, the content and visual appearance of the first smart template document corresponding at least in part to the first destination profile.

3. The method of claim 2, farther comprising communicating the first smart template document to a selected output location.

4. The method of claim 2, farther comprising selecting a second destination profile from the plurality of destination profiles, the second destination profile comprising an output compatibility of the second smart template document, the content and visual appearance of the second smart template document corresponding at least in part to the second destination profile.

5. The method of claim 1, wherein the content and visual appearance of the first smart template document correspond at least in part to the case material profile.

6. The method of claim 5, wherein the content and visual appearance of the second smart template document correspond at least in part to the case material profile.

7. The method of claim 1, wherein the content and visual appearance of the first smart template document correspond at least in part to the first document profile.

8. The method of claim 7, wherein the content and visual appearance of the second smart template document correspond at least in part to the second document profile.

9. The method of claim 1, wherein the smart template farther comprises an event profile.

10. The method of claim 1, wherein the smart template is media independent.

11. The method of claim 1, further comprising providing a plurality of smart templates, each corresponding to one or more of a plurality of constituency profiles, the smart template comprising one of the plurality of smart templates and the first and the second constituency profiles comprising ones of the plurality of constituency profiles.

12. The method of claim 1, wherein the providing comprises calling the case material profile from a storage location.

13. The method of claim 1, wherein the expiration parameter comprises a time period.

14. The method of claim 1, wherein the expiration parameter comprises an event-related date.

15. A computer readable medium adapted to store instructions executable by a processor, the instructions for automatically generating personalized communications that when executed by the processor cause the processor to:
   provide a smart template with a case material profile, the case material profile comprising an interest parameter, a supporter level parameter, and an expiration parameter;
   verify the case material profile has not expired based on the expiration parameter;
   associate a first constituency profile and a second constituency profile with the smart template based on the interest parameter and the supporter level parameter, the first constituency profile comprising preferences corresponding to a first user, including a first schedule preference, and the second constituency profile comprising preferences corresponding to a second user, including a second schedule preference;
   select a first layout profile from a plurality of layout profiles and a first document profile from a plurality of document profiles, the selecting based on the first user preferences to generate a first smart template document, the first layout profile comprising a style of the first smart template document, the content and visual appearance of the first smart template document corresponding at least in part to the first layout profile and the first constituency profile, the type of document of the first smart template document corresponding to the first document profile;

select a second layout profile from the plurality of layout profiles and a second document profile from the plurality of document profiles, the selecting based on the second user preferences to generate a second smart template document, the second layout profile comprising a style of the second smart template document, the content and visual appearance of the second smart template document corresponding at least in part to the second layout profile and the second constituency profile, the type of document of the second smart template document corresponding to the second document profile, wherein the first and second layout profiles are different layout profiles, the first and second document profiles are different document profiles; and generate the first smart template document, based on the first schedule preference of the first user, and the second smart template document, based on the second schedule preference of the second user.

16. The computer readable medium of claim 15, wherein the instructions further cause the processor to:

select a first destination profile from a plurality of destination profiles, the first destination profile comprising an output compatibility of the first smart template document, the content and visual appearance of the first smart template document corresponding at least in part to the first destination profile.

17. The computer readable medium of claim 16, wherein the instructions further cause the processor to:

select a second destination profile from the plurality of destination profiles, the second destination profile comprising an output compatibility of the second smart template document, the content and visual appearance of the second smart template document corresponding at least in part to the second destination profile.

18. The computer readable medium of claim 15, wherein the content and visual appearance of the first smart template document correspond at least in part to the first document profile.

19. The computer readable medium of claim 15, wherein the instructions further cause the processor to:

provide a plurality of smart templates, each corresponding to one or more of a plurality of constituency profiles, the smart template comprising one of the plurality of smart templates and the first and the second constituency profiles comprising ones of the plurality of constituency profiles.

20. The computer readable medium of claim 15, wherein the expiration parameter comprises a time period.

* * * * *